United States Patent [19]

Wagner et al.

[11] 4,013,625
[45] Mar. 22, 1977

[54] PROCESS FOR THE LINEARIZATION OF POLYURETHANES WITH LACTAMS AND LACTAM ADDITION COMPOUNDS

[75] Inventors: Kuno Wagner, Leverkusen; Manfred Dahm, Berg.-Neukirchen, both of Germany

[73] Assignee: Bayer Aktiengesellschaft, Leverkusen, Germany

[22] Filed: Dec. 2, 1975

[21] Appl. No.: 636,892

Related U.S. Application Data

[63] Continuation of Ser. No. 383,939, July 30, 1973, abandoned.

[30] Foreign Application Priority Data

Aug. 5, 1972 Germany .......................... 2238667

[52] U.S. Cl. ......................................... 260/77.5 AA
[51] Int. Cl.² ....................................... C08G 18/08

[58] Field of Search ............. 260/2.5 BD, 77.5 AA, 260/77.5 A, 45.75 R, 45.95 R, 45.95 A

[56] References Cited

UNITED STATES PATENTS 3,738,946  6/1973  Frulla et al. .................. 260/77.5 A

*Primary Examiner*—M. J. Welsh
*Attorney, Agent, or Firm*—Gene Harsh; Joseph C. Gil

[57] ABSTRACT

Isocyanate polyaddition products which are cross linked via allophanate, biuret, uretdione or uretone imine groups are linearized with liquid lactams or azalactams and their addition products. The invention is particularly useful for the substantial elimination of allophanate, biuret, uretone imine, and uretdione groups in cross linked cellular polyurethane resins.

10 Claims, No Drawings

PROCESS FOR THE LINEARIZATION OF POLYURETHANES WITH LACTAMS AND LACTAM ADDITION COMPOUNDS

This is a continuation of application Ser. No. 383,939, filed July 30, 1973, and now abandoned.

This invention relates to a new process for the selective elimination of biuret, allophanate, uretdione and uretone and uretone imine groups from the molecular structure of cross-linked polyurethanes. The process makes possible the production of novel linearized cellular synthetic resins and foams.

In view of the increasing quantities of waste produced in processing polyurethane products, there is great interest in finding a technically simple method of converting polyurethane waste products (e.g. elastomer waste, foams, foam flakes, films, porous foils, threads etc.) into products which can be returned to the production process.

In the past it has only been known that high molecular weight polyurethanes can be degraded in a not very selective manner into low molecular weight products by prolonged heating in polar solvents, which causes the urethane and/or ester bonds to be broken.

It is therefore an object of this invention to provide a process for the substantial elimination of biuret, allophanate, uretdione and uretone imine groups from high molecular weight cross-linked polyurethane. Another object of this invention is to provide a method of increasing the quality of waste produced in processing polyurethane products, and particularly cellular polyurethane products.

The foregoing objects and others are accomplished in accordance with the invention generally speaking by providing a process for the linearization of isocyanate polyaddition products which are cross-linked via allophanate, biuret, uretone imine or uretdione groups by the reaction thereof with lactams, azalactams or their addition products with adduct forming substances which contain Zerewitinoff-active hydrogen atoms. The invention represents a new and particularly valuable method of linearization since all of the chain lengthening isocyanate bonds such as urea groups and urethane groups are preserved in the molecular structure.

This invention therefore relates to a process for selective elimination of biuret, allophanate, uretone imine and uretdione groups from polyurethane resins, characterized in that the synthetic resin material is impregnated with at least one molten or dissolved lactam and/or addition compound of lactams and adduct-forming substances which contain at least one Zerewitinoff-active hydrogen atom, the state of swelling is maintained for at least 5 seconds and the linearizing agents may thereafter be partly or completely removed by extraction or evaporation, the lactams, if desired, being caused to crystallize within the polyurethane matrix by evaporation of the adduct-forming substance.

The process according to the invention makes it possible for the first time for polyurethane substrates to be subjected to a rapid selective linearization reaction. At the same time, the process also makes it possible to obtain foams which cannot be produced by direct foaming since the foams produced from linear hydroxyl compounds, polyisocyanates and water are invariably cross-linked by way of biuret bonds and allophanate groups even in formulations with isocyanate numbers of below 100.

The preferred addition compounds of lactams and adduct-forming substances which contain Zerewitinoff-active hydrogen atoms used for linearization in the process according to the invention, e.g. addition compounds of the following formulae:

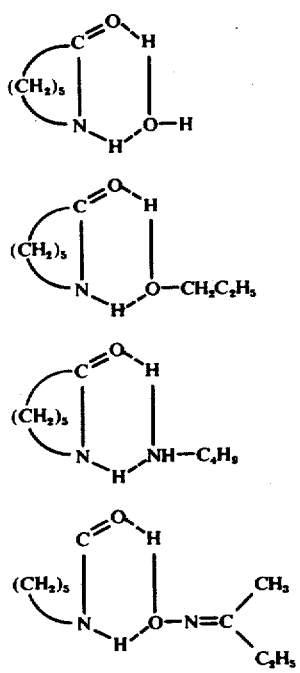
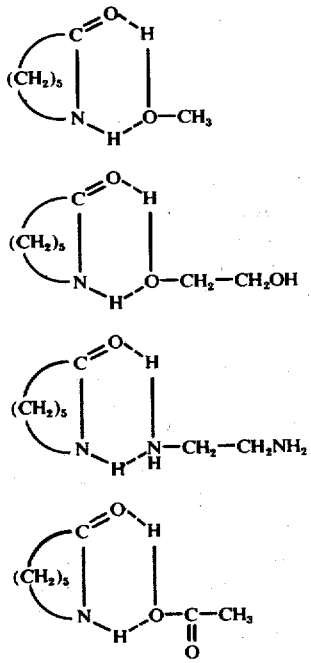

act in an activated form on the biuret and allophanate bonds by way of the components which contain lactam groups but particularly by way of the components which contain hydroxyl, amino, amido, acid or oxime groups. Any cross-linked cellular substrates left to swell in these compounds undergo rapid regrouping in the labile bonds. When ε-caprolactam-methanol addition products are used as swelling agents, linearization may be represented by the following idealized reaction scheme:

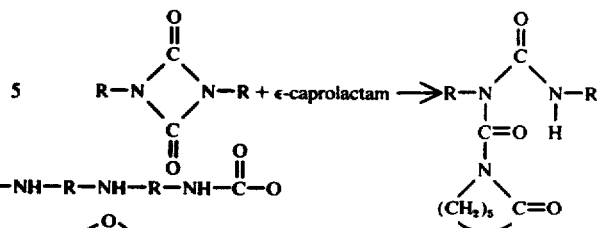

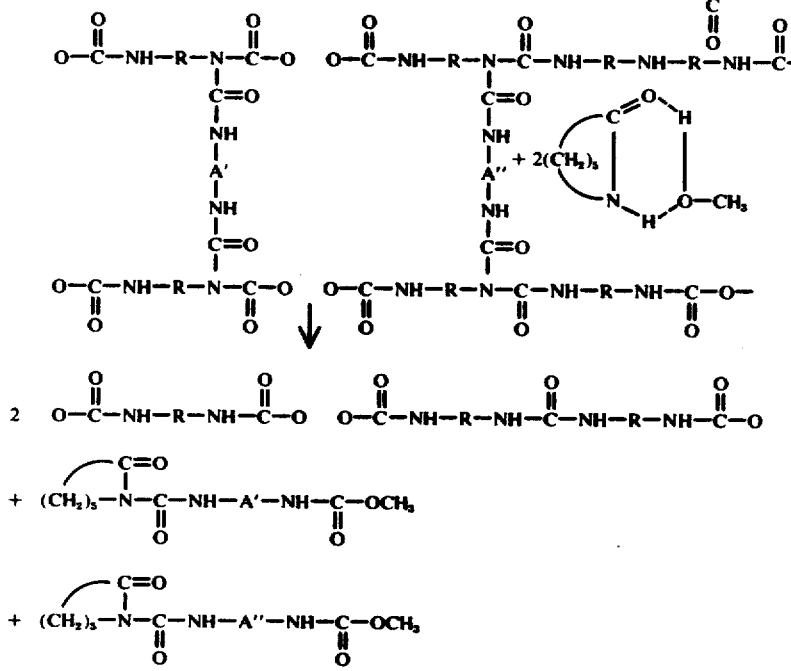

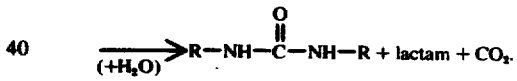

in which
A' denotes the radical of a divalent diisocyanate or the radical of a high molecular weight or not very high molecular weight, wide-meshed cross-linked polyurethane segment or polyurea segment and symbolizes the cross-linking of the allophanate;
A" corresponds in its meaning to A' and represents biuret cross-linking.

Similarly, when the reaction is carried out with lactam-amine adducts the cross-linking segments are eliminated with the formation of urea end groups.

Linearization with decomposition of the biuret and allophanate groups proceeds independently of the nature of the polyisocyanates of which the foam is composed (aliphatic or aromatic polyisocyanates) and independently of the constitution of the soft segment of the foam (polyester, polyether, polythioether, polycarbonate or polyacetal segments). The somewhat higher stability of aliphatic, cycloaliphatic and araliphatic biuret and allophanate groups can be compensated for by slightly increasing the temperature of linearization (e.g. to 60°–80° C).

Analytical investigations have shown that the linearizing agents according to the invention also linearize uretdione and uretone imine groups. In the case of uretdiones, this takes place via the intermediate stage of biurets:

Among the chain cross-linking types of isocyanate bonds, the only ones which are resistant to the linearizing agents according to the invention are isocyanurate bonds. Since such bonds are practically non-existent in the usual foam formulations, complete linearization can be achieved by spliting of all the labile isocyanate bonds in the foam. Urethane and urea groups, i.e. the chain lengthening isocyanate bonds, are kept completely intact in the process. In foams produced from triols, for example, the cross-linking urethane bonds are, of course, not split but foams which are cross-linked only via stable bonds are obtained. Swelling of polyurethane foams is accompanied by extreme expansion and a very high swelling pressure is produced practically spontaneously in the linearizing agents according to the invention. The linearizing swelling agents are therefore brought very rapidly into contact with the molecular regions of the cellular substrates. It is therefore possible to accelerate greatly the linearization reaction according to the invention by the addition of suitable catalysts so that the reaction will be completed within a few seconds. This is of considerable commercial importance.

Any foams based on polyesters put into the process may in addition be modified in the properties of the linearized foams by partial spliting of the ester segments or amidation during the linearization reaction. The texture, hydrophilic character, openness of the cells and compression resistance of the foams can be substantially influenced by this method.

Both the linearization and the excessive stretching of the cell walls which on the one hand is caused by the swelling pressure and on the other hand may be caused by the onset of crystallization of the lactam within the cells of the foam, result in fundamental and new changes in the properties of the cellular substrates, which will be described in more detail below and in the examples.

The linearizing agents used for the process according to the invention, which act as swelling agents and in some cases also crystallizing agents, are preferably and remarkably low viscosity liquid addition compounds of the $\epsilon$-caprolactam, the preparation of which has been described e.g. co-pending applications Ser. No. 207,560 and 207,562 and in Example 1. Liquid, dissolved or melted lactams such as butyrolactam, valerolactam, $\epsilon$-caprolactam and N-methyl-hexahydro-1,4-diazepinone-(3) are also preferred.

The above mentioned lactam addition products and mixtures thereof are extremely powerful swelling agents and in some cases are also readily crystallizable. They are universally applicable to any foams since they are capable of swelling both hydrophobic and very hydrophilic foams. The capacity for crystallization and the swelling pressure can be varied within wide limits by suitable choice of the hydroxyl components or components which contain amine, acid, hydroxylamine or CH-acid groups in addition compounds and their mixtures.

The following addition products are particularly preferred: Addition products of $\epsilon$-caprolactam with 1 to 5 mols of water, methanol, ethanol, butanol or isopropanol; solutions of these addition products in excess lactam; lactam melts which contain small quantities of water; caprolactam itself; addition products of $\epsilon$-caprolactam with 1 to 2 mols of methylol caprolactam, phenol, butanone oxime, cyclohexanone oxime, bisphenol A and chlorophenol with nitrophenols, trichloroethanol, ethanolamines or glycerol. Mixtures of lactams with monoamines and polyamines which are in addition equilibrium such as those described in Example 1 are also very suitable, particularly those of the $\epsilon$-caprolactam and 2 to 3 mols of 1-amino-3,3,5-trimethyl-5-aminomethyl-cyclohexane.

Solutions of lactams or the above mentioned addition products in acetone, tri- and perchlorethylene, methylene chloride, 1,3-dioxolane, methyl ethyl ketone, benzene, xylene, ethylene glycol acetate, dimethylformamide, dimethylacetamide, glycol carbonate, dimethylsulphoxide, pyridine, dimethyl aniline, malonic acid esters or ethyl acetoacetate are also suitable linearizing agents.

The process according to the invention of linearizing polyurethanes with elimination of labile isocyanate bonds may be carried out with or without catalysts. The linearized foams obtained have characteristic compression strengths and spring constants according to the length of time of linearization.

Elimination of labile isocyanate bonds proceeds extremely rapidly in the presence of catalysts. The reaction time is only 20 to 30 seconds even at room temperature, and with moderately active catalysts 1 to 2 minutes. It therefore becomes very easy to carry out the process of the invention continuously. The following are mentioned as preferred catalysts: Sodium, potassium, lithium, zinc, magnesium and aluminum alcoholates and phenolates, their hydroxides and carbonates, the salts of these metals with organic acids such as acetic acid, propionic acid, butyric acid or stearic acid; the potassium and sodium salts of isononyl phenol and p-nitrophenol; sodium and potassium carbonate, sodium and potassium salts of mercapto compounds, and complexes of ethylacetoacetate, acetyl acetone, etc. with, for example aluminum, bismuth, zinc, copper or manganese.

Any catalysts from the group of tertiary amines which catalyze isocyanate reactions are suitable since they also catalyze the linearization reaction according to the invention. The following tertiary amines are preferred: Triethylamine, tributylamine, N-methylmorpholine, N-ethylmorpholine, N-cocomorpholines, N,N,N',N'-tetramethyl-ethylenediamine, 1,4-diazabicyclo-(2,2,2)-octane, N-methyl-N'-dimethyl-aminoethylpiperazino, bis-[(2-(N,N-dimethylamino)-ethyl]-ether, N,N-dimethylbenzylamine, bis-(N,N-diethylaminoethyl) adipate, N,N-diethylbenzylamine, pentamethyldiethylene-triamine, N,N-dimethylcyclohexylamine, N,N,N',N'-tetramethyl-1,3-butanediamine, N,N-dimethyl-$\beta$-phenylethylamine, 1,2-dimethylimidazole, 2-methylimidazole and silaamines with carbon-silicon bonds as described e.g. in German patent specification No. 1,229,290, specific examples being 2,2,4-trimethyl-2-silamorpholine and 1,3-diethyl-aminomethyl-tetramethyldisiloxane.

Tertiary amines which contain active hydrogen atoms are also suitable, e.g. triethanolamine, triisopropanolamine, N-methyl-diethanolamine, N-ethyl-diethanolamine, dimethylethanolamine and their reaction products with alkylene oxides such as propylene oxide and/or ethylene oxide.

Instead of amines, other nitrogen-containing bases such as tetraalkylammonium hydroxides or also hexahydrotriazines may be used as catalysts.

The reactions according to the invention are also catalyzed by organic tin compounds, e.g. stannoacylates such as tin-II-octoate, tin-II-ethyl hexoate, tin-II-valerate, tin-II-acetate and tin-II-laurate or dialkyl tin salts of carboxylic acids, e.g. dibutyl tin diocetate, dibutyl tin dilaurate, dibutyl tin maleate or dioctyl tin diacetate.

Zinc chloride, calcium chloride, magnesium chloride, tin-II-chloride and lithium iodide may also be added to the addition products of the $\epsilon$-caprolactam-methanol and $\epsilon$-caprolactam-water which are the preferred linearizing agents.

Polyurethane foams obtained from any method of preparation may be subjected to the process according to the invention of selective elimination of allophanate, uretdione, uretone imine and biuret bonds. Soft or semi-hard open cell foams such as those described e.g. in co-pending application Ser. No. 155,284 are preferred.

The process according to the invention is very simple to carry out. The foam is impregnated e.g. by compressing it in melts or solutions of lactams, lactam adducts or their mixtures. Excess linearizing agent may be squeezed off if desired. The reaction time depends mainly on the quantity of catalyst used and decreases with increasing temperature employed. To obtain a maximally open-celled structure, it is often advantageous to evaporate the hydroxyl component (e.g. water or alcohol) from the lactam adduct by mild heating to about 35° C. The lactam is thereby caused to crystallize within the matrix and the resulting crystals strongly felt and perforate the cell membranes. After removal of the lactam by washing with water, novel, extremely soft foams with very open cells are obtained which have a velvety texture and leather-like character. In this variation of the process, optimum effects can be obtained by charging the matrix with the maximum amount of lactam adduct, e.g. 300 to 500% by weight, without squeezing off the surplus.

The process of impregnation may also be carried out continuously. In this case, the foam is compressed in the lactam addition products or their mixtures by means of rollers and the excess quantity of impregnating solution may then be squeezed off outside the solution if desired. In the presence of catalysts, linearization is in most cases completed within 30 to 120 seconds. Thereafter, the foam is again squeezed with rollers in a water bath and residual lactam is washed out.

The process according to the invention and the processing of the linearized products are particularly simple because the linearizing agents and their mixtures are all miscible with water in any proportions so that the linearizing agents can easily be dissolved out of the matrix.

The process according to the invention is also technically very easy to carry out continuously, especially if it is operated without pressure, because the particularly preferred foam matrices which are elastic matrices with densities of about 15 to 40 kg/cm$^3$ have an extremely large cell volume available. This cell volume is capable of binding liquid lactam adducts in amounts of up to 800% of the weight of the matrix in such a manner that the linearizing agents absorbed are homogeneously distributed. The endless polyurethane bands are impregnated by means of compression and decompression processes in charging zones equipped with suitable roller apparatus which press the band and release the pressure in the impregnating bath. A subsequent pressing operation which may be carried out e.g. mechanically by means of rollers enables the linearizing agent to be adjusted to practically any concentration in the matrix.

According to another variation of the process, impregnation (and linearization) e.g. of polyurethane waste or foam flakes is carried out with simultaneous shaping and bonding at normal or elevated pressure, in particular in the presence of aqueous polyurethane ionomer dispersions. Fleece-like mouldings and panels can be produced continuously by this method.

The process according to the invention for linearizing foams makes possible the following special fields of application:

When applied to foams obtained from bifunctional higher molecular weight dihydroxy compounds and diisocyanates or biuret triisocyanates and/or allophanate triisocyanates, the process according to the invention also makes possible the production of thermoplastically deformable foams and the conversion of crosslinked foams into thermoplastically workable powders.

Crystallization of ε-caprolactam in the polyurethane matrix not only causes swelling in the first instance but also produces extremely high tensions and results in the mechanical stretching and perforation of closed cell walls. A maximally open cell structure can then be obtained by dissolving out the ε-caprolactam. The quantity of swelling agent used may be several times the weight of the cellular substrate, especially in the case of ε-caprolactam adducts, which are the preferred swelling agents. Crystallization results in a network of crystallized ε-caprolactam arranged in a completely dust-free manner in the matrix. This ε-caprolactam may constitute up to 95% of the total weight. The excessive stretching is eliminated once the ε-caprolactam has been dissolved out. Very soft foams with a textile character and a velvety handle are obtained.

The swelling pressure resulting from solvation with the linearizing agents according to the invention is particularly concentrated at the nodal points of the cell walls and can be increased to such an extent by a slight increase in temperature that the cell walls partly break when subjected to an additional pressure, e.g. when the swelled polyurethane band is rolled. When the ε-caprolactam is subsequently dissolved out, powerful irreversible compression of the matrix takes place to a preselected extent to result in soft, completely novel foams which have a spongy character or powerfully compacted cellular, fibrous substrates with a leather-like character. This variation of the process makes it possible to control the density and reduce the pore size of the foam.

The ε-caprolactam addition products are also excellent solvents for many $Cu(I)$, $Cu(II)$ and manganese salts as well as for various $Cu(II)$ diamine and polyamine complexes. These copper and manganese compounds are carried to the molecular regions of the polyurethane matrix during the extremely rapid swelling and are uniformly distributed therein. After removal of the caprolactam by washing, $Cu(II)$ and manganese (II) salts and their complexes, in particular, remain behind substantially uniformly distributed in the matrix and impart to the foam resin an increased resistance to yellowing under the influence of light and discoloration under the influence of heat by a stabilizing process in accordance with co-pending application Ser. No. 017,349.

ε-Caprolactam addition products are also excellent solvents for the various phenolic antioxidants which are frequently used as age resistors. Their uniform distribution in the linearized polyurethane matrix can be carried out in the same manner as that described above for the metal salts (see also Examples 5 and 6).

ε-Caprolactam addition products are good solvents for low molecular weight epoxy compounds and also for higher molecular weight epoxy resins, pyrocarbonic acid esters, ortho-carbonic acid esters, etc. The liquid lactam adducts which are powerful and, in some cases, extremely powerful, swelling agents carry these additives into the molecular regions of the foam and thereby enable alkylating reactions to take place between the above mentioned compounds and the light sensitive amino end groups of the foams which are susceptible to oxidation, with the result that discoloration in the presence of light is substantially slowed down.

Polyurethane foams which have been linearized or partly linearized by the process according to the invention are capable of an exceptionally high degree of swelling in various solvents and swelling agents or liquid reactants after reduction of their degree of crosslinking. They are therefore optimum cellular substrates for the processes according to pending U.S. application Ser. No. 017,349 and abandoned U.S. application Ser. No. 015,240, owing to a plurality of one-component and multi-component reactions at the phase interfaces of these foam resins which have been modified by linearization, the solids are spatially oriented and ordered into a cellular form, these changes being accompanied by significant three-dimensional growth.

The invention is further illustrated but is not intended to be limited by the following examples in which all parts and percentages are by weight unless otherwise specified.

EXAMPLE 1

Preparation of the linearizing agents according to the invention.

113 Parts by weight (1 mol) of crystallized ε-caprolactam, m.p. 70° C, are mixed in each case with the following components at 50° to 70° C:

| | |
|---|---|
| a) 18 Parts by weight of water | (1 mol) |
| b) 23.4 Parts by weight of water | (1.3 mol) |
| c) 36 Parts by weight of water | (2 mol) |
| d) 54 Parts by weight of water | (3 mol) |
| e) 90 Parts by weight of water | (5 mol) |
| f) 32 Parts by weight of methanol | (1 mol) |
| g) 62 Parts by weight of ethylene glycol | (1 mol) |
| h) 122 Parts by weight of ethylene glycol | (2 mol) |
| i) 90 Parts by weight of butane-1,4-diol | (1 mol) |
| j) 180 Parts by weight of butane-1,4-diol | (2 mol) |
| k) 106 Parts by weight of thiodiglycol | (1 mol) |
| l) 340 Parts by weight of 1-amino-3,3,5-trimethyl-5-aminomethyl-cyclohexane | (2 mol) |
| m) 170 Parts by weight of 1-amino-3,3,5-trimethyl-5-aminomethyl-cyclohexane | (1 mol) |
| n) 170 Parts by weight of 1-amino-3,3,5-trimethyl-5-aminomethyl-cyclohexane and 116 Parts by weight of hexamethylenediamine | (1 mol + 1 mol) |
| o) 136 Parts by weight of m-xylylenediamine | (1 mol) |
| p) 198 Parts by weight of 4,4'-diaminocyclohexane | |
| q) 74 Parts by weight of tert.butanol and 170 Parts by weight of 1-amino-3,3,5-trimethyl-5-aminomethyl-cyclohexane | (1 mol + 1 mol) |
| r) 148 Parts by weight of tert.butanol and 340 Parts by weight of 1-amino-3,3,5-trimethyl-5-aminomethyl-cyclohexane | (2 mol + 2 mol) |
| s) 60 Parts by weight of isopropanol and 170 Parts by weight of 1-amino-3,3,5-trimethyl-5-aminomethyl-cyclohexane | (1 mol + 1 mol) |
| t) 74 Parts by weight of n-butanol and 170 Parts by weight of 1-amino-3,3,5-trimethyl-5-aminomethyl-cyclohexane | (1 mol + 1 mol) |
| u) 74 Parts by weight of tert.butanol and 50 Parts by weight of hydrazine hydrate | (1 mol + 1 mol) |
| v) 74 Parts by weight of tert.butanol and 50 Parts by weight of hydrazine hydrate and 170 Parts by weight of 1-amino-3,3,5-trimethyl-5-aminomethyl-cyclohexane | (1 mol + 1 mol + 1 mol) |
| w) 90 Parts by weight of butane-1,4-diol and 340 Parts by weight of 1-amino-3,3,5-trimethyl-5-aminomethyl-cyclohexane | (1 mol + 2 mol) |
| x) 119 Parts by weight of N-methyl-diethanolamine, 50 Parts by weight of hydrazine hydrate and 340 Parts by weight of 1-amino-3,3,5-trimethyl-5-aminomethyl-cyclohexane | (1 mol + 2 mol + 2 mol) |
| y) 32 Parts by weight of methanol and 94 Parts by weight of phenol | (1 mol + 1 mol) |
| z) 32 Parts by weight of water, 60 Parts by weight of urea and 94 Parts by weight of phenol | (1 mol + 1 mol + 1 mol). |

Low viscosity liquids which are very readily miscible with various polyhydroxyl compounds, organic solvents, antioxidants, additives, catalysts, etc. are obtained in all cases (a) to (z).

If ε-caprolactam in the mixtures mentioned under a) to o) which are in association equilibrium is replaced in each case by 1 mol of butyrolactam, valerolactam or azalactams such as 1-N-methyl-hexahydro-1,4-diazepinone-(3), 1-N-ethyl-hexahydro-1,4-diazepinone-(3) or 1-n-propylhexahydro-1,4-diazepinone-(3) and the compounds which contain Zerewitinoff active hydrogen atoms are replaced by oximes such as cyclohexanone oxime, butanone oxime, acetic acid, propionic acid or CH-acidic compounds such as acetoacetic acetate, malonic ester, acetylacetone, etc., then the mixtures obtained are again low viscosity mixtures which have a very powerful swelling and linearizing action.

EXAMPLE 2

This example illustrates that the vigorous and almost spontaneous swelling of polyurethane foam resins which takes place in the highly fluid addition compounds of 1 mol of ε-caprolactam and 1.2 mol of methanol is accompanied by elimination of all the biuret and allophanate groups while the chain lengthening bonds of the segments (urethane and urea groups) are preserved. The analytical data given also indicate the order of molecular weights which can be attained in the preparation of the polyurethane foams.

The open cell polyether-polyurethane foam used in this example was prepared as described below from a linear α,ω-dihydroxy-propylene glycol polyether:

100 Parts by weight of a linear polyether with OH number 49 prepared from propylene oxide with 1,2-propylene glycol as starter, 2.7 parts by weight of water, 1.0 part by weight of a polyether polysiloxane, 0.4 parts by weight of triethylenediamine and 0.4 parts by weight of a tin(II) salt of 2-ethylcaproic acid are mixed together. 36.3 Parts by weight of tolylene diisocyanate ( 80% 2,4- and 20% 2,6-isomer) are added to this mixture and vigorously mixed with a high speed stirrer. Foam formation sets in after a starting time of 10 seconds and a white, soft, elastic, cross-linked polyurethane foam is obtained which has an open-pore structure and a unit weight of 38 kg/m$^3$ and theoretically is cross-linked with an excess of 0.02 NCO equivalents (NCO ratio 102). The product is heated for 2 hours at 100° C.

A block of this foam measuring 30 cm × 15 cm × 5 cm (2250 cm$^3$, approx. 83.3 parts by weight) is impregnated with about 800 parts by weight of the low-viscosity ε-caprolactam-methanol addition compound mentioned above at 30° C, until saturated. The block expands spontaneously. The swelling pressure produced is so strong that when the foam attains dimensions of 47 cm × 23 cm × 8 cm it loses its dimensional stability and completely breaks down. It is stirred in a ground glass beaker at 30° C for ½ hour, a transparent, gel-like mass which has undergone a high degree of swelling being produced. 3000 Parts by weight of water are stirred into this mass, a rubber-like sheet being obtained. This sheet is broken down into granules and freed from ε-caprolactam adhering to it by extracting four times with 300 parts by weight of water.

80 Parts by weight of the dried, rubber-like product which is thermoplastic at 150° C are dissolved in dimethyl-formamide at room temperature. Quantitative linearization of the cross-linking polyurethane has therefore been effected. Only 0.5 parts by weight, i.e. 0.6% of insoluble solids can be centrifuged off the opalescent dimethylformamide solution. The rubber-like polyurethane is even soluble in 1:1 mixtures of methyl ethyl ketone and dimethylformamide up to a concentration of 30%. When this solution is painted on supports of glass, wood or metals, a firmly adhering, elastic, rubber-like film which consists of uncross-linked, high molecular weight polyurethanes is obtained after evaporation of the solvent.

In 0.5% solution, the high molecular weight linearized polyurethane has an internal viscosity of 0.72, which corresponds to an average molecular weight of 28,000.

EXAMPLE 3

The dimensional stability of the polyurethane foam resin linearized in accordance with the invention is preserved when, for example, a polyurethane foam obtained from a trifunctional polyol is subjected to linearization, the foam remaining cross-linked via the stable urethane groups while the unstable bonds are eliminated. The cross-linked foam was prepared as follows:

100 Parts by weight of a polyether with OH number 49 prepared from propylene oxide and ethylene oxide using a 1:1 mixture of trimethylolpropane and 1,2-propylene glycol as starter, 2,7 parts by weight of water, 1.0 part by weight of a polyether polysiloxane, 0.2 part by weight of triethylene diamine and 0.2 part by weight of tin(II) salt of 2-ethylcaproic acid are mixed together. 36.3 Parts by weight of tolylenediisocyanate (80% 2,4- and 20% 2,6-isomer) are added to this mixture and vigorously mixed with a high speed stirrer. Foam formation sets in after a starting time of 10 seconds and a white, soft-elastic, polyurethane foam is obtained which has an open cell structure and a unit weight of 38 kg/m$^3$ and a compression strength (DIN 35 577) of 56 p/cm$^2$ an 40% compression.

A block of this foam measuring 30 cm × 15 cm × 5 cm (83.3 parts by weight) is impregnated and saturated with 450 parts by weight of a linearizing agent (1 mol of $\epsilon$-caprolactam and 1.2 mols of methanol) as described in Example 1 by squeezing it in a roller apparatus, freeing from air, again impregnating it and squeezing it. The foam swells spontaneously but preserves its geometric block shape. The dimensional changes resulting from the swelling process are surprisingly great and take place almost spontaneously and symmetrically.

Original dimensions of the matrix: 30 × 15 × 5 cm = 2250 cm$^3$. After swelling: 47 × 23.5 × 8 cm = 8833 cm$^3$.

The increase in volume is therefore $$V = 6583 \text{ cm}^3,$$

i.e. based on the original volume of the matrix the increase in volume is about 300%. The matrix absorbs about 352 parts by weight of the $\epsilon$-caprolactam adduct. The methanol is evaporated from the addition product by storing the foam in a current of air at 25° C, the $\epsilon$-caprolactam crystallizing in the form of pointed, needle-shaped, felted crystals in the molecular regions of the matrix and on the surface of the cell membrane as well as in the cellular cavities of the matrix. A semi-hard foam which contains about 73.5% by weight of crystallized $\epsilon$-caprolactam is obtained. The walls of the cells burst under the crystallization pressure and maximum opening and expansion of the cells occurs. The crystals irreversibly fix the positive dimensional changes which took place at the onset of swelling. The $\epsilon$-caprolactam crystallized in the matrix is surprisingly completely solid and free from dust, i.e. it is bound like a homogeneously distributed high molecular weight substance. This foam is stored at room temperature for 10 days during which time it retains its geometrical form. The $\epsilon$-caprolactam arranged in cellular form is then extracted by soaking the foam in water, squeezing it and again soaking it. After drying in a vacuum drying cupboard at 50° C, a linearized foam is obtained which has undergone a total increase in volume, based on that of the original matrix, by about 25%. The foam is very soft, has a velvety handle and is completely open celled. Whereas the compression strength of the original foam is 46 p/cm$^2$ at 40% compression according to DIN 53 577, the compression strength after linearization has dropped to 22 p/cm$^2$. After impregnation with water, the linearized foam retains large quantities of water in the cavities of its pores and when compressed it has the feel of leather which has swelled in water.

Although after swelling the foam block is increased in volume from 2250 cm$^3$ to 8883 cm$^3$ (dimensions approximately 56.6% in length, 56.6% in width and 60% in height) by the swelling pressure and subsequent crystallization and the matrix is severely stretched and fixed in this stretched state by the crystallization of $\epsilon$-caprolactam, the geometrical block form of the matrix is preserved after the stretch is released by removing the $\epsilon$-caprolactam by dissolving it in water. Expansion of linearized foam is therefore always accompanied by a substantially symmetrical shift of the edges and corners.

EXAMPLE 4

The procedure is the same as described in Example 3 and the same foam is used as matrix but the liquid linearizing agent used is an addition product of 1 mol of $\epsilon$-caprolactam, 0.6 mol of methanol and 0.5 mol of phenol. The volume of the matrix increases almost spontaneously by about 326% in much the same way as described in Example 3. The methanol is left to evaporate at room temperature and the $\epsilon$-caprolactam and phenol in the matrix are then crystallized at -10° C and subsequently removed by washing in methanol and then in water. An extremely open celled linearized foam is obtained which compared with the original matrix has increased in volume by about 15 volumes percent. It has a compression strength of 18 p/cm$^2$ at 40% compression and a soft, textile-like handle.

If in this example the linearizing agent is replaced by a mixture of 1 mol of $\epsilon$-caprolactam, 0.5 mol of ethylene glycol, 0.5 mol of mxylylenediamine and 2 mols of dimethylformamide, both the length, width and height of the matrix increase by about 58% as a result of swelling. After removal of the lactam by washing from this very highly swelled matrix, the linearized foams obtained have an extremely open-celled structure and great softness such as cannot be obtained by direct foaming using carbon dioxide as blowing agent.

EXAMPLE 5

The procedure is exactly as described in Example 3 and the same foam is used as matrix but the linearizing agent used is 600 parts by weight of an $\epsilon$-caprolactam solution containing 15 parts by weight of water and heated to 62° C. Crystallization of the lactam sets in immediately on cooling of the fully charged matrix, and the increase in volume of the matrix by about 183% is fixed (increase in length, width and height each about 40.4%). The crystallized $\epsilon$-caprolactam is washed out with water after 4hours and an extremely soft linearized foam which is suitable for laminating textiles is obtained.

If in this example the foam block is replaced by a foam foil which is then treated under the same conditions of swelling without waiting for crystallization of the $\epsilon$-caprolactam, by linearizing at 75° C slightly above the melting point of the $\epsilon$-caprolactam, then the product obtained after washing the foil and removing the lactam by dissolving it with water is an extremely soft foil which is particularly suitable for laminating textiles and for use as fleecy lining.

EXAMPLE 6

This example illustrates the interesting changes in properties obtained by linearizing a hydrophilic foam. Very soft products with extremely reduced compression strengths are obtained.

The hydrophilic foam was prepared as follows:

100 Parts by weight of a polyether which has been started on glycerol and contains 60% of ethylene oxide units and 40% of propylene oxide units (hydroxyl number 26), 3.0 parts by weight of water, 0.8 parts by weight of a polyether polysiloxane, 0.15 parts by weight of triethylene diamine and 0.35 parts by weight of the tin-(II) salt of 2-ethyl-caproic acid are mixed together. 35.7 Parts by weight of tolylene diisocyanate (65% 2,4-and 35% 2,6-isomer) are added to this mixture and vigorously mixed with a high speed stirrer. Foam formation sets in after starting time of 8 seconds and a white, soft-elastic, open celled polyurethane foam which has a unit weight of 36 kg/m$^3$ and compression strength (DIN 53 577) at 40% compression of 44 p/cm$^2$ is obtained. The foam is hydrophilic and when wet increases its volume by 150% by swelling.

The linearizing agents used is a low viscosity addition product of $\epsilon$-caprolactam and water which has been prepared by simply dissolving 1 mol of $\epsilon$-caprolactam with 1.5 mols of water at 35°–40° C.

When a foam block measuring 5 cm $\times$ 9.8 cm $\times$ 15.1 cm = 745 cm$^3$ (26 parts by weight) is impregnated in the linearizing agent described above, it swells to the dimensions of 7 cm $\times$ 13.8 cm $\times$ 21.4 cm = 2080 cm$^3$. The increase in width and height are therefore about 41% and the increase in length about 48%. The water is left to evaporate at about 25° C in the course of 2 days, the $\epsilon$-caprolactam crystallizing in a cellular form in the matrix and the increase in dimensions being irreversibly fixed. The semi-hard foam is then squeezed with a roller, soaked in water and purified from $\epsilon$-caprolactam adhering to it by repeatedly absorbing and squeezing out the water. After drying, the foam consists of a very soft block measuring 5.4 cm $\times$ 10.9 cm $\times$ 16.6 cm (29 parts by weight). Its density is about 30.7 kg/m$^3$ whereas the density of the original matrix was 36 kg/m$^3$. This very soft foam which has a maximally open cell structure has increased in weight as a result of linearization by about 10% by weight, based on the weight of the original matrix, this weight increase being partly due to the incorporation of $\epsilon$-caprolactam in the course of linearization of the allophanate and biuret bonds and partly to the association of the lactam in the high molecular weight substrate. The total increase in volume of the new foam is about 31.4 volumes percent compared with the original matrix, the expansion being accompanied by completely symmetrical displacement of the edges and corners of the block. The compression strength of this linearized foam is extremely reduced. Whereas the matrix had a compression strength of 44 p/cm$^2$ at 40% compression according to DIN 53 577, the linearized foam has a compression strength of only 10 p/cm$^2$ and is distinguished by an exceptionally pleasant handle.

If the procedure is again carried out as described above in this example and phenolic antioxidant whose hydroxyl groups are also capable of adduct formation with the lactam are dissolved in the linearizing agent in concentrations of about 3% by weight, based on the weight of the matrix, then the foams obtained after linearization are again extremely soft, open-celled foams with greatly reduced compression strengths. Their light-fastness is greatly increased compared with that of the original matrix. Whereas the matrix undergoes severe yellowing after only one week in daylight and in the presence of traces of industrial waste gases such as halogens, hydrochloric acids and sulphur dioxide, the linearized foam is still light in color after 2 months. In the swelling process which accompanies linearization, the phenolic antioxidants are only fixed in the molecular regions of the matrix by intermolecular forces and are therefore more effective than they would be in the case of direct foaming which may result in chemical incorporation of the phenolic OH groups into the polymer. Increased resistance to discoloration by oxidation are achieved in this example particularly by additions of 2 to 3% by weight of 1,1,3-tris-(2-methyl-4-hydroxy-5-tert. butyl-phenyl)-butane; 2,6-di-tert. butyl-p-cresol; 2,2'-methlene-bis-(4-methyl-6-tert. butyl-phenol); 4,4'-thio-bis-(3-methyl-6-tert. butyl-phenol); 4,4'-butylidene-bis-(3-methyl-6-tert. butyl-phenol) and 2-hydroxy-4-methoxy-benzophenone.

If 0.025 parts by weight of copper acetate or manganese-(II) acetate or the ammoniates of copper acetate and 1-amino-3,3,5-trimethyl-5-aminomethyl-cyclohexane are dissolved in the linearizing agent of this example, it is surprisingly found that the resistance to yellowing achieved are approximately the same as those obtained with phenolic antioxidants.

EXAMPLE 7

This example illustrates that the selective elimination of biuret and allophanate groups from foams under mild operating conditions can be greatly accelerated by the addition of catalysts, whereby the process can be technically simplified.

The matrix used is the polyether foam described in Example 3 which is not very hydrophilic.

Blocks of this foam measuring 30 cm $\times$ 15 cm $\times$ 5 cm (= 2250 cm$^3$; 83.3 parts by weight) and having a compression strength of 56 p/cm$^2$ at 40% compression are impregnated with the addition product of 1 mol of $\epsilon$-caprolactam and 1.2 mols of methanol (approximately 75% by weight of caprolactam in 100 parts by weight of the swelling agent), the $\epsilon$-caprolactam addition product in each case in addition containing one of the following catalysts and stabilizers:

a. 0.6 Parts by weight of sodium hydroxide and 8.3 parts by weight of 2,6-di-tert. -butyl-p-cresol,
b. 0.3 Parts by weight of potassium hydroxide and 5.3 parts by weight of 2,2'-methylene-bis-(4-methyl-6-tert. butyl-phenol),
c. 0.8 Parts by weight of potassium formate and 0.03 parts by weight of Cu(II) acetate,
d. 3 Parts by weight of endoethylenepiperazine,
e. 14 Parts by weight of dimethylbenzylamine,
f. 10 Parts by weight of trimethylhexahydrotriazine,
g. 12 Parts by weight of N-methyldiethanolamine,
h. 6 Parts by weight of 2,4,6-tris-dimethylaminomethyl phenol,
i. 6 Parts by weight of anhydrous hydrochloric acid,
j. 6 Parts by weight of formic acid,
k. 10 Parts by weight of the addition product of 1 mol of triethylamine and 3 mols of formic acid.

Increases in volume by about 6590 cm³ occurs spontaneously on impregnation at 35° C in all cases a) to k). After a total of 3 minutes, the impregnated foams are freed from ε-caprolactam by treatment with water and squeezed between rollers. In spite of the short reaction time, linearized foams with a very open cell structure, greatly reduced compression strengths and the following percentage increases in volume are obtained:

TABLE 1

|   | Compression strength (DIN 53 577) p/cm² determined at 40% compression | % increase in volume |
|---|---|---|
| matrix | 56 | 0 |
| a | 25 | 15 |
| b | 23 | 17 |
| c | 28 | 11 |
| d | 29 | 9 |
| e | 30 | 8 |
| f | 31 | 8 |
| g | 32 | 8 |
| h | 29 | 10 |
| i | 35 | 6 |
| j | 34 | 7 |
| k | 36 | 6 |

The linearized foams a to c have greatly increased resistance to yellowing by light or traces of halogen and sulphur dioxide. When foam flakes having a cross-section of 0.8 cm are linearized under the same conditions, very soft flakes are obtained which can be bonded with aqueous polyurethane latices to produce soft, elastic polyurethane mouldings.

EXAMPLE 8

This example illustrates that in the process of linearization according to the invention, fleecy, compacted foams with a leather-like character can be obtained immediately by applying an external pressure counteracting the swelling pressure. The procedure is in this case the same as described under a to c in Example 7 but immediately after impregnation the product is compacted between two heated rollers at 70° C. The foam is thereby irreversibly compacted and when washed with water, open celled fleece-like foams with a leather-like character are obtained which have been compacted in height by about 70%. Cross-linked foams obtained from polythioethers, polyacetals, polycarbonates of hexanediol and polyethers of tetrahydrofuran and foams obtained from various polyesters behave in a completely analogous manner, as the following example illustrates.

EXAMPLE 9

Linearization according to the invention can be carried out within a very short time particularly in the case of polyester foams, partly with slight degradation of the polyester segments.

A polyester foam foil which has been produced from a foam of the following formulation is used:

100 Parts by weight of a branched polyester of diethylene glycol, trimethylolpropane and adipic acid with OH number 62, 3 parts by weight of an accelerator (adipic acid ester of N-diethylethanolamine) and 3.6 parts by weight of water are mixed together. 42.5 parts by weight of an isomeric mixture of 80% of tolylene-2,4-diisocyanate and 20% of tolylene-2,6-diisocyanate are added to this mixture and stirred with a high speed stirrer. The resulting foam has a unit weight of about 43 kg/m³.

The linearizing agent used is the adduct of ε-caprolactam and methanol used in Example 7, containing 0.5% by weight, based on the matrix, of a N NaOH solution as catalyst.

Even if the foil is impregnated for only 30 seconds and then repeatedly washed after it has been compacted at room temperature, very soft foams with a textile character are obtained which have been compacted e.g. by about 80% in height.

If in this example the lactam adduct used for linearization is replaced by corresponding low viscosity addition products of 1 mol of butyrolactam or valerolactam, 1-N-methyl-hexahydro-1,4-diazepinone-(3), 1-N-ethyl-hexahydro-1,4-diazepinon-(3) or 1-N-propyl-hexahydro-1, 4-diazepinone-(3) and 3 mols of methanol and the procedure is otherwise carried out in the same way as indicated in this example, extremely soft foams are again obtained which have been compacted by up to 80% in height.

If a. 4% by weight of the bis-epoxide of 1 mol of hexamethylene diisocyanate and 2 mols of glycidyl alcohol or b. 6% by weight of the addition product of 1 mol of hexamethylene diisocyanate and 2 mols of sodium bisulphite (in each case based on the weight of the matrix)

are added to the linearizing agents of this example, then very soft compressed foils are obtained which are more resistant to yellowing by light and heat than the original matrix.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the linearization of isocyanate polyaddition products which are cross-linked via biuret, allophanate, uretdione or uretone imine groups which comprises reacting said isocyanate polyaddition products with a lactam, or a mixture of said lactam in association equilibrium with a Zerewitinoff active hydrogen containing compound, by impregnating said isocyanate polyaddition products thereby to cause said polyaddition products to swell, maintaining the state of swelling at least 5 seconds, and thereafter at least partly removing said lactam by extraction or evaporation from said polyurethane product.

2. The process of claim 1 wherein said isocyanate addition product is a cellular polyurethane.

3. Process of claim 1, wherein the lactams used have the following general formula

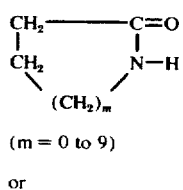

(m = 0 to 9)

or

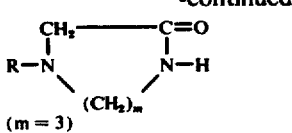

wherein
R denotes an aliphatic or araliphatic radical or a pyridine radical which may be substituted by lower alkyl radicals.

4. Process of claim 1, wherein mixtures of lactams, in association equilibrium with mono- or polyamines, hydrazines, urea, thiourea, butanone oxime, cyclohexanone oxime, malonic acid esters, acetoacetic acetate, acetyl acetone, formic acid, acetic acid, propionic acid, alcohols or water in a molar ratio of lactam to adduct-forming compound of between 0.1:1 and 10:1 is employed.

5. Process of claim 1 wherein said isocyanate addition product is a polyurethane foam and the lactam is crystallized within the matrix by evaporation of the adduct forming compound.

6. Process of claim 1 wherein the swelling and recrystallization of the lactam is carried out in the presence of 0.005 to 4% by weight of a catalyst selected from the group consisting of sodium, potassium or lithium hydroxides, carbonates, alcoholates, phenolates and formates; 2,4,6-tri-dimethylaminomethylphenol, endoethylenepiperazine, dimethylbenzylamine, N',N'',N'''-triethyl-hexahydrotriazine or permethylated diethylenetriamine.

7. Process of claim 1 wherein 0.005 to 10% by weight of phenolic antioxidants, Cu(I) chloride, Cu(II) acetate or manganese (II) acetate, Cu-ammoniates or Cu-diamine complexes are added with said lactam.

8. Process of claim 1 wherein 0.005 to 10% by weight of glycidyl alcohol, polyepoxides of bisphenol A and epichlorhydrin, urethane group-containing epoxides of 1 mol of hexamethylene diisocyanate and 2 mols of glycidyl alcohol, biuret group-containing epoxides of 1 mol of triisocyanatohexylbiuret and 3 mols of glycidyl alcohol, bis-epoxides of 1 mol of $\alpha,\omega$-diisocyanato-prepolymers of bifunctional polyhydroxyl compounds having an average molecular weight of 800 to 6000 and 2 mols of gycidyl alcohol or o-carbonic acid esters, triethyl orthoformate or pyrocarbonic acid esters, or sodium bisulphite adducts of diisocyanate and 2 mols of sodium bisulphite, are added to the lactams.

9. Process of claim 1 wherein the recrystallization of the lactams inside the polyurethane foams which have undergone swelling is carried out by applying an external pressure of 1 to 300 kg/cm$^2$ which opposes the swelling and crystallization pressure.

10. Process of claim 1 wherein said isocyanate polyaddition product is polyurethane foam flakes which have diameters of 2 to 50 mm.